United States Patent
Stein et al.

(10) Patent No.: US 8,108,111 B2
(45) Date of Patent: Jan. 31, 2012

(54) HYDROSTATIC REGENERATIVE DRIVE SYSTEM

(75) Inventors: Uwe Bernhard Pascal Stein, Edinburgh (GB); Michael Richard Fielding, Edinburgh (GB)

(73) Assignee: Artemis Intelligent Power Limited, Scotland (GB)

( * ) Notice: Subject to any disclaimer, the term of this patent is extended or adjusted under 35 U.S.C. 154(b) by 477 days.

(21) Appl. No.: 12/375,079

(22) PCT Filed: Jul. 26, 2007

(86) PCT No.: PCT/GB2007/002875
§ 371 (c)(1),
(2), (4) Date: Apr. 21, 2009

(87) PCT Pub. No.: WO2008/012558
PCT Pub. Date: Jan. 31, 2008

(65) Prior Publication Data
US 2009/0210120 A1 Aug. 20, 2009

(30) Foreign Application Priority Data

Jul. 27, 2006 (GB) .................................. 0614930.6

(51) Int. Cl.
*G06F 7/00* (2006.01)
(52) U.S. Cl. ............................. 701/51; 701/67; 180/367
(58) Field of Classification Search ................. 701/51, 701/67; 180/367
See application file for complete search history.

(56) References Cited

U.S. PATENT DOCUMENTS

| | | | | |
|---|---|---|---|---|
| 5,043,892 A * | 8/1991 | Brekkestran et al. | ........... | 701/51 |
| 5,152,191 A * | 10/1992 | Sato et al. | ........ | 477/36 |
| 5,737,712 A * | 4/1998 | Han et al. | ......... | 701/51 |
| 5,964,675 A * | 10/1999 | Shimada et al. | ............ | 475/123 |
| 6,292,732 B1 * | 9/2001 | Steinmetz et al. | ............. | 701/67 |
| 7,225,704 B2 * | 6/2007 | Ishii et al. | ................. | 74/606 R |
| 7,811,188 B2 * | 10/2010 | Brown | ............. | 474/43 |

FOREIGN PATENT DOCUMENTS

| | | |
|---|---|---|
| EP | 1433648 | 6/2004 |
| EP | 1591295 | 11/2005 |
| GB | 2415670 | 1/2006 |
| WO | 02/43980 | 6/2002 |

* cited by examiner

*Primary Examiner* — Toan To
(74) *Attorney, Agent, or Firm* — Stephen H. Eland; Dann, Dorfman, Herrell & Skillman (57) ABSTRACT

A variable transmission comprises a first fluid working machine (1) for connection to a prime mover (2), a second fluid working machine (5) for connection to a mechanical load (6) and a fluid system linking the first and second working machines, the fluid system having a high-pressure side (3) and a low-pressure side (4) each connected to both said first and said second fluid working machines (1, 5), a fluid accumulator (7) on the high-pressure side, a means to admit fluid from the reservoir to the low-pressure side and a pressure control valve to maintain the correct pressure in the low-pressure side, wherein the second fluid working machine (5) includes chambers of variable volume having electronically controllable valves such that each of said chambers has pumping, motoring and idling modes of operation, and the second fluid working machine (5) is operable to both source fluid to and sink fluid from each of said high-pressure side (3) and said low-pressure side (4).

23 Claims, 6 Drawing Sheets

HYDROSTATIC REGENERATIVE DRIVE SYSTEM

PRIORITY APPLICATIONS

This application is a 371 application of International Application No. PCT/GB2007/002875 filed Jul. 26, 2007, which claims priority to United Kingdom Patent Application No. 0614930.6 filed Jul. 27, 2006. The entire disclosure of each of the foregoing applications is hereby incorporated herein by reference.

FIELD OF THE INVENTION

This invention relates to a hydrostatic infinitely variable transmission. More specifically this invention relates to the type of transmission based on the Digital Displacement™ principal as is described in Patent EP0361927 and in Patent EP0494236. This invention has particular reference to a system which is capable of capturing excess energy, for example during vehicle deceleration, and storing this energy in a hydraulic accumulator, so that it can be reused later in order to improve economy and enhance driveability. The invention specifically refers to such a system operating without the need for a large accumulator on the low-pressure side of the system but still providing appropriate charge pressure to the fluid working machines at times of high operational speed in order to avoid inlet cavitation. This invention has particular reference to a vehicle propulsion application, but its use in other hydrostatic transmission applications is not ruled out. It further has particular reference to systems where an elevated pressure on the suction side of the fluid working machines is required for at least part of its operating conditions.

BACKGROUND OF THE INVENTION

Hydrostatic transmission systems are widely used to transmit power from prime movers to individual loads. In their most basic configuration hydrostatic transmissions consist of a first fluid working machine, which is mounted to a prime mover, and a second fluid working machine, which is connected to the load. In the case of vehicle propulsion the first machine might be connected to the IC-Engine and the second machine might be coupled to the wheels or tracks. These transmissions are often used for propulsion and work function in off highway vehicles and to drive loads in industrial applications. They have also been considered for propulsion in on-highway vehicles and transmission systems in the renewable energy sector. The penetration of these markets has been limited, mainly due to the poor part load efficiency of these systems. If this fundamental limitation can be resolved this type of transmission has the fundamental advantage that an accumulator can be installed in the transmission to store energy at times when there is excess energy available, for example during deceleration. This energy can be released at a time of renewed torque demand improving efficiency and performance. In these systems the accumulators typically work on the principle that they compress a gas, which is contained in a pressure vessel and separated from the working fluid by means of a flexible membrane or piston.

Most loads will require some degree of torque, speed and rotation direction control. This can either be achieved through control of the displacement on one or all fluid working machines employed, or through control valves in the circuit.

When used in combination with an accumulator in order to store surplus energy at times when the load is driving the second fluid working machine, and this energy is returned to the second fluid working machine when required, extra, often complex, fluid working circuits are required. Furthermore, during the charge process the net volume of working fluid inside the accumulator increases, requiring the hydrostatic transmission circuit to replace this volume in other parts of the system. Often this problem is compounded by the common requirement to maintain an elevated pressure on the suction side of the fluid working machines in order to avoid inlet cavitation. If this is the case a second accumulator is typically employed on the low-pressure side in order to maintain a stable charge pressure at times fluid is stored and released from the high-pressure storage accumulator. This will increase system cost, weight and space requirement. An alternative is to provide a charge pump capable of providing the full flow required and intaking directly from the reservoir.

Systems proposed in the past can be broadly divided into two groups, the so-called open circuit transmissions and closed circuit transmissions.

Open circuit systems typically employ one fluid line to supply the high-pressure fluid to the load and a second one for the low-pressure return reservoir. The first fluid working machine always intakes from the reservoir and pumps fluid in the direction of the high-pressure fluid line. A direction control valve in front of the second machine is typically employed in order to change the rotational direction of the second fluid working machine. The accumulator is typically connected to the high-pressure fluid line through an on/off valve. The low-pressure side is always kept at reservoir pressure. These systems typically require large diameter fluid lines on the low-pressure side in order to avoid inlet cavitation. There is further the requirement of a large reservoir in order to provide enough fluid to avoid air entering the system when the accumulator is fully charged.

Closed circuit systems are typically arranged in a symmetrical layout with two fluid lines between the first and second fluid working machine. There is no defined high or low-pressure side of the system. In order to control direction and speed of the second fluid working machine the first machine is arranged so that it can intake from either one of the two fluid lines pumping fluid into the other one, thereby controlling the rotational direction of the load. Since the high and low-pressure side of the system are changing it is not possible to passively source fluid from a reservoir in order to make up for leakage or to compensate for thermal expansion. These systems typically employ a charge pump, which feeds fluid from a reservoir into the current low-pressure side system. A so-called shuttle valve is typically employed in order to determine the current low-pressure side of the system. These systems have the advantage of a charge pressure on the current machine inlet sides, resulting in a reduction of diameter in the required fluid lines and smaller suction manifolds. However, due to the change of high and low-pressure fluid line during operation, complex valve arrangements are required in order to connect an energy storage accumulator into the system. There is further the requirement to switch a sufficient compliance to the current low-pressure side of the system in order to maintain the required inlet charge pressure during the charge and discharge of the high-pressure storage accumulator.

In both cases above and in general it is possible to increase the maximum pumping speed of a given hydraulic machine by increasing the pressure on the suction manifold. This technique can reduce the size, cost and weight of machine. The requirement of elevated inlet pressure on the suction side of the machine is only present at times of high rotational speeds, and even then only when the machine is operating in the pumping mode. It is further important to realise that the required level of charge pressure does not follow a linear relationship to the operational speed. This is due to the quadratic relationship between flow rate (thus operational speed) and pressure drop. A machine which can operate at speeds of n with an atmospheric charge pressure of 1 bar might only achieve an operational speed of 1.5*n at 4 bar charge. The upper limit of the charge pressure sets the maximum operating speed for pumping, and is limited by the shaft seals and maximum allowable tank pressures of the hydraulic machines, but the limit without charge pressure may be only a little below this maximum.

SUMMARY OF THE INVENTION

Therefore, a principle aim of the present invention is to provide a fluid system that provides the required level of charge pressure at times when required without the use of large low-pressure compliance, which is typically provided in the form of low-pressure accumulators, or a high flow source of fluid at elevated pressure.

Another aim of the present invention is to only guarantee the presence of the charge pressure at times it is required in order to avoid inlet cavitation.

It is a further aim of the present invention to provide a defined high pressure and defined low pressure hydraulic line so as to provide for simpler and cheaper hydraulic connections.

This invention has particular reference to the use of the Digital Displacement™ technology described in EP-A-0361927 and in EP-A-0494236 for both the first and the second fluid working machine, but its use with a different type of machine for the first fluid working machine is not ruled out. The basic structure of a Digital Displacement™ machine is similar to the conventional reciprocating machine, with poppet valves connecting to the low and high-pressure manifolds of each cylinder. But, instead of being self-acting, each of the poppet valves is equipped with an electro-magnetic actuator. The valves are operated by a micro-controller at precise times in order to establish fluid connection between the moving piston and the appropriate manifold. This control allows cylinders to behave in any of three ways: they can pump or motor—adding or subtracting fluid from the high-pressure manifold—or they can be disabled. The function of each cylinder can be changed at each end of each stroke. As the valves are actuated at times in the cycle when there is almost no pressure difference across them, the actuators can be compact and use little power. Either permanent magnets or springs are used to maintain the disabled poppets at default positions. A micro-controller controls the valves via power semiconductors. The pump-motor can be run so as to control displacement, pressure, flow or many other variables by enabling the appropriate number of cylinders in the appropriate cycles for the conditions and requirements.

The present invention provides a transmission according to claim 1. Optional features of the invention are set out in the dependent claims.

With individual cylinders being controlled by the microprocessor through the actuation of the associated valves these machines can change their direction of rotation and direction of torque without the need to swap tank and pressure inlets. This feature allows for the design of transmission circuits with one distinct high-pressure side and one distinct low-pressure side of the circuit but avoiding the need of direction control valves. With a well defined high pressure side and the capability of the second fluid working machine to sink or source energy from it for both directions of rotation the installation of the high-pressure energy storage accumulator and the hydraulic connections are greatly simplified. If an elevated pressure is required on the low-pressure side of the system then there is still the requirement to have some means, for example a second low-pressure accumulator, to stabilize this pressure during the charge and discharge process of the high-pressure energy storage accumulator. The present invention describes a way in which this requirement can be eliminated or reduced to a minimum, without the associated problems of systems operating from an open reservoir.

In transmission applications the requirement to capture energy from the load (charge the accumulator) is often only present at velocities below the maximum allowed operating velocity of the vehicle. For the example of regenerative vehicle braking, this is because the maximum speed at which regenerative braking makes economical sense might be below the top speed of the vehicle, because this is where the most common operating points are and therefore where most energy can be saved. Furthermore, the amount of kinetic energy to be stored is proportional to the square of the vehicle speed, so recapturing energy during deceleration at very high speeds rapidly overwhelms (fills) the accumulator.

Because the maximum speed of regenerative braking is limited to a vehicle speed which in practice is below the maximum operational speed of the second fluid working machines, it leads to the surprising observation that it is possible to design a system whereby the second fluid machine operates from an atmospheric pressure during regenerative braking (charging of the high-pressure storage accumulator) and switches back to operation with elevated charge pressure for other operations.

BRIEF DESCRIPTION OF THE DRAWINGS

Specific embodiments of the invention will now be described, by way of example only, with reference to the accompanying drawings, in which.

DETAILED DESCRIPTION OF PARTICULAR EMBODIMENTS

Figure 1:
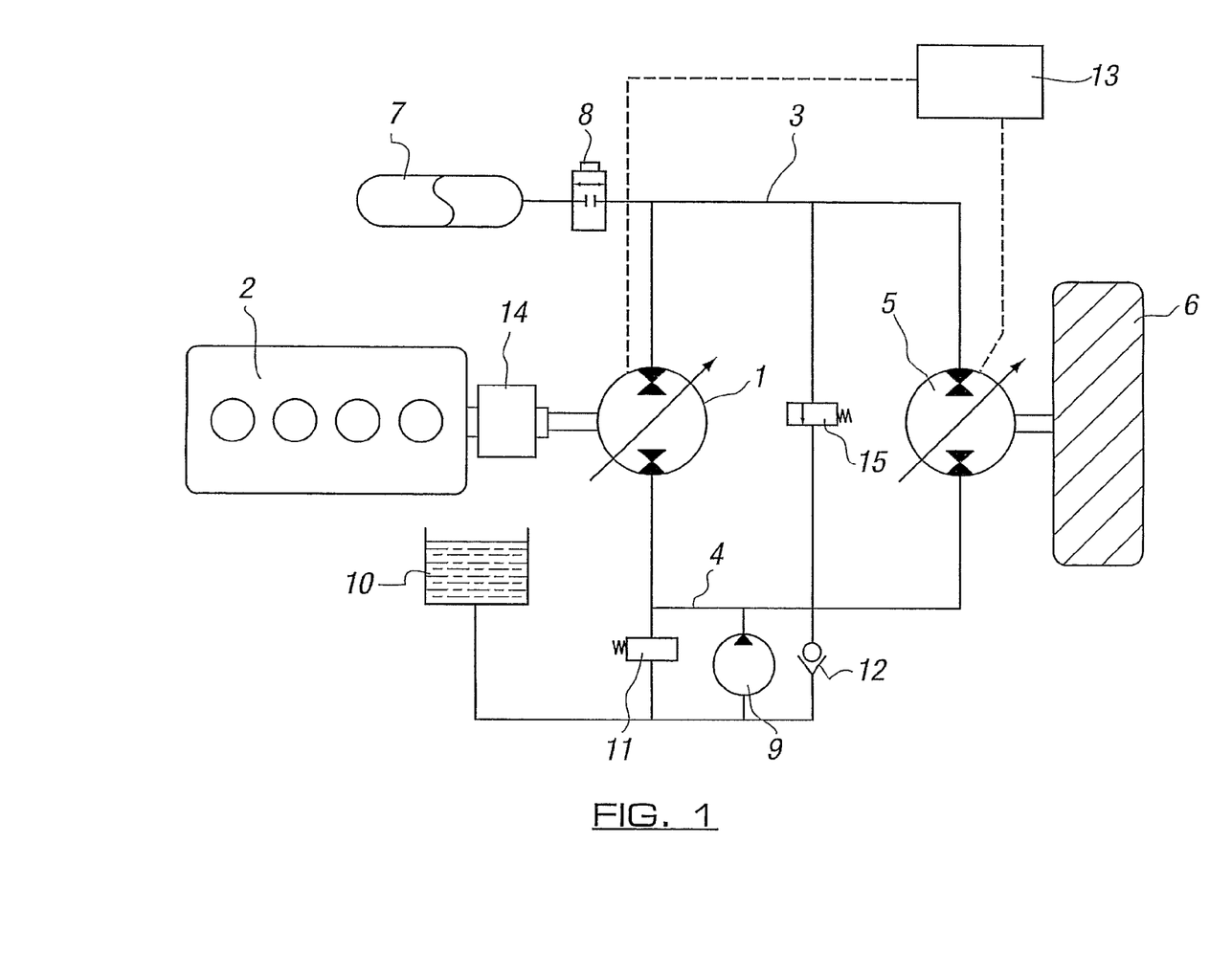
FIG. 1 shows the basic system layout.

FIG. 1 shows a possible embodiment of the transmission circuit, different layouts providing the same functionality are not ruled out. The system consists of a first fluid working machine 1 possibly of Digital Displacement™ principle driven by a prime mover 2. The first fluid working machine 1 might be driven directly from the prime mover or through a unit 14, which might contain a clutch or gear drive or both. The high-pressure fluid manifold is connected to a high-pressure fluid line 3. The low-pressure fluid manifold is connected to a low-pressure line 4. A second fluid working machine 5, preferably of Digital Displacement™ principle, is connected to a load 6. Its high-pressure manifold is connected to the fluid line 3 and its low-pressure manifold to a low-pressure fluid line 4. A high-pressure accumulator 7 is connected to the high-pressure fluid line 4 possibly through an on/off valve 8.

A microprocessor 13 is employed to control the first fluid working machine 1 and second fluid working machine 5. The microprocessor unit 13 might be further employed to control other aspects of the system such as engine torque, the pressure in the system lines 3, 4, the operation of the valves 8, 11, 12, 17, and the operation of the clutch and gear unit 14. Several different microprocessors may fulfil parts of these tasks, as will be obvious to a person skilled in the art.

A charge pump 9 may be employed to pump fluid from a reservoir 10 into the low-pressure fluid line 3. This pump 9 is preferably of positive displacement nature but the use of different types such as centrifugal type is not ruled out. Parallel to this a pressure control valve 11 is installed to limit the pressure level of fluid line 3, which is above the pressure in reservoir 9. The pressure control valve 11 might be of passive nature but the use of an active pressure control valve is not ruled out. Further, again in parallel, a one-way valve 12 is installed in a way that it opens when the low-pressure line 4 falls below the pressure in the reservoir 10. The one-way valve 12 might be of passive nature but the use of an active valve is not ruled out.

The following is a description of the different modes of operation.

Start of Operation

When the system is started the charge pump 9 may pump fluid from the reservoir 10 into the low-pressure fluid line 4 until the required charge pressure, which is controlled by the pressure control valve 11, has been reached. At the same time or out of phase from this, the fluid working machine 1 is started, either from high-pressure accumulator 7 or from prime mover 2 driving said fluid working machine 1 through clutch or gearbox unit 14.

Operation from Prime Mover

During drive operation from prime mover the first fluid working machine 1 is mechanically driven from the prime mover 2 and intakes fluid from the low-pressure fluid line 4 which it pumps into the fluid line 3. The second fluid working machine 5 intakes fluid from the fluid line 3 and drives to the load 6 in the required direction, which is controlled by the microprocessor 13. The flow control valve 8 is in the closed position, so that fluid output from second machine 5 equals fluid uptake of first machine 1 thereby maintaining pressure in low-pressure line 4. With no flow in and out of the accumulator 7 the net volume of the system changes only through the thermal expansion, compressibility of the system and system fluid. Charge pump 9 is sized to compensate for this effect, maintaining a set charge pressure in fluid line 4. This pressure will be set to avoid inlet cavitation of the first fluid working machine 1 for all anticipated operation conditions. The reverse operation follows the same principle as the forward operation, but the second fluid working machine 5 is controlled by the microprocessor to operate in the opposite rotational direction.

Freewheeling

Both the first fluid working machine 1 and the second fluid working machine are in idle mode and no fluid is transferred. The charge pump 9 might be stopped or might be kept operational during this mode of operation.

Operation with Regenerative Braking

During braking with regeneration the fluid working motor unit 5 intakes fluid from the fluid line 4 and pumps it into the fluid line 3. This operation is possible for both directions of rotation. The first fluid working machine 1 is operated in idle (accepting no flow) or accepts fluid from fluid line 3 at a lower flow rate than that provided into fluid line 3 by the second fluid working machine 5. With the control valve 8 in the open position the fluid provided into fluid line 3 will be absorbed by the accumulator 7. With fluid taken out of fluid line 4 and no or less fluid provided into said fluid line 4 by the second fluid working machine 5, the pressure in fluid line 4 will fall the moment that the intake flow from the second fluid working machine 5 exceeds the flow provided by the charge pump 9. Once the pressure has fallen below the pressure of the reservoir 10 the one-way valve 12 will open providing the remaining flow into the fluid line 4. The second fluid working machine 5 is now operating from the reservoir pressure and its maximum speed of operation without cavitation might be limited. Once the regenerative braking process stops or the intake flow rate difference from the second fluid working machine 5 and first fluid working machine 1 falls below the flow rate provided by the charge pump 9 the pressure in the fluid line 4 returns to its set level. The charge pump 9 might be stopped or might be kept operational during this mode of operation.

Braking Operation without Regeneration

During braking without regeneration, the fluid working motor unit 5 intakes fluid from the fluid line 4 and pumps it into the fluid line 3. The control valve 8 is in the closed position. The first fluid working machine 1 is either operated idle or to accept fluid from the fluid line 3. In the case that fluid is accepted from fluid line 3 reverse torque is provided towards the prime mover 2. If the first fluid working machine 1 is operated in idle or if the flow accepted from the first fluid working machine 1 is less than the flow provided by the second fluid working machine 5, the pressure in fluid line 3 will rise until the pressure control valve 15 opens discharging the fluid into fluid line 4. The charge pump 9 might be stopped or might be kept operational during this mode of operation.

Drive Operation from Accumulator

During drive operation from the accumulator 7 the flow control valve 8 is in the open position and the accumulator provides fluid towards the fluid line 3. The second fluid working machine 5 accepts fluid from the fluid line 3 and drives the load in forward or reverse direction. The first fluid working machine 1 is operated in idle or also provides fluid into the fluid line 3. With the second fluid working machine 5 providing more fluid into the fluid line 4 than the first fluid working machine 1 is taking out of fluid line 4 the pressure in fluid line 4 rises. The pressure control valve 11 opens to relieve the excess fluid back to the reservoir.

It would further be conceivable that the prime mover 2 is started by the first fluid working machine 1. In this mode of operation the first fluid working machine 1 would be operated as a motor accepting fluid from the fluid line 3 and discharging fluid into fluid line 4. The fluid could be provided into fluid line 3 by either accumulator 7 with flow control valve 8 in open position or by the second fluid working machine 5.

Figure 2:
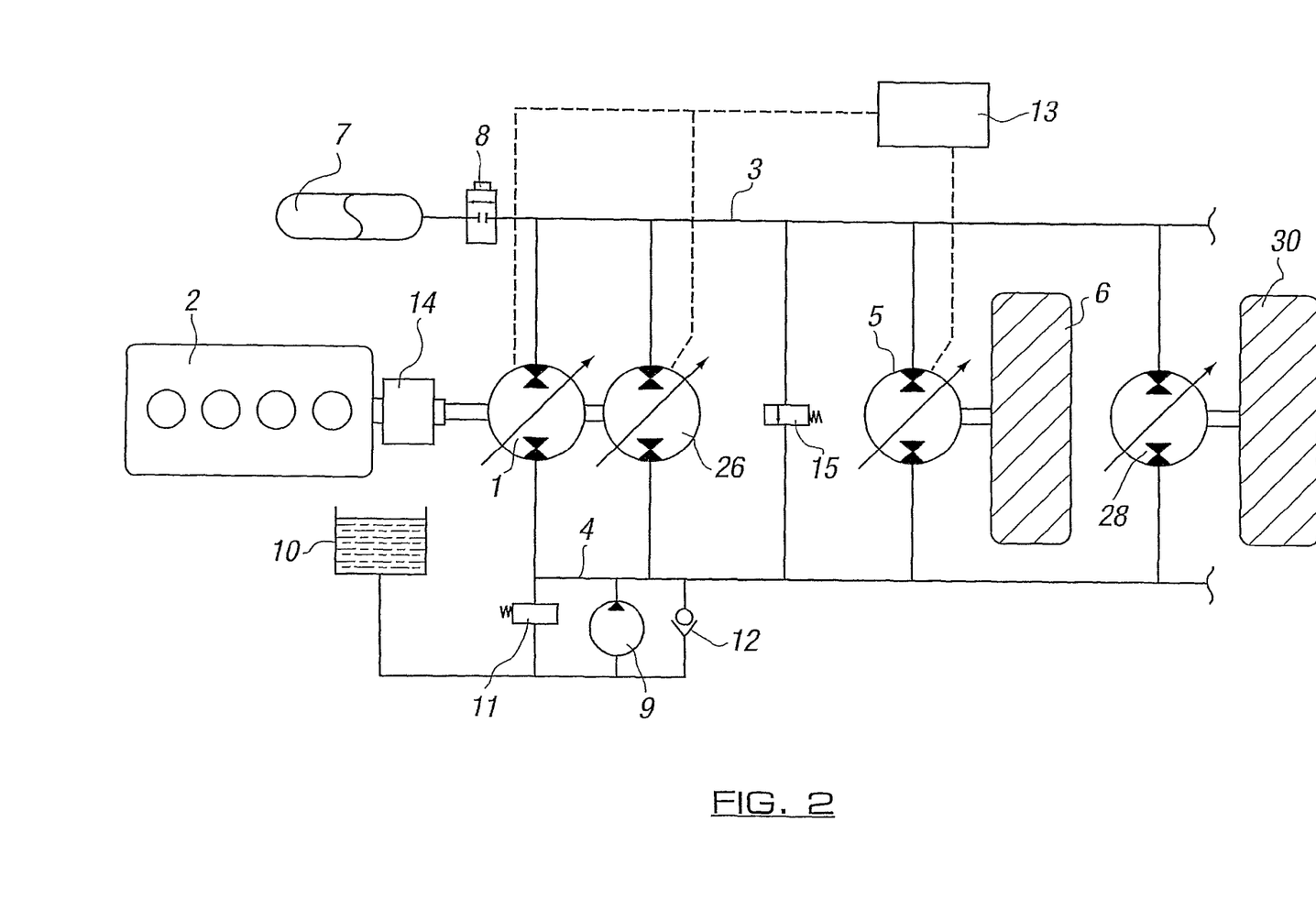
FIG. 2 shows a system with a plurality of fluid working machines.

FIG. 2 shows an arrangement with a plurality of first fluid working machines 1 and 26 connected to the prime mover 2 through unit 14, and a plurality of second working machines 5 and 28 connected to loads 6 and 30. Further fluid working machines, having individually a similar purpose to either the first or second machines so shown, may be added as will be obvious to a person skilled in the art. All second fluid working machines 5 and 28 intake and exhaust low-pressure fluid from the same low-pressure line 4 as each other, and in addition share a common high-pressure line 3. Likewise, all first working machines 1 and 26 intake and exhaust low-pressure fluid from the same low-pressure line 4 as each other, and at least one of said machines communicates with the high-pressure line 3.

Figure 3:
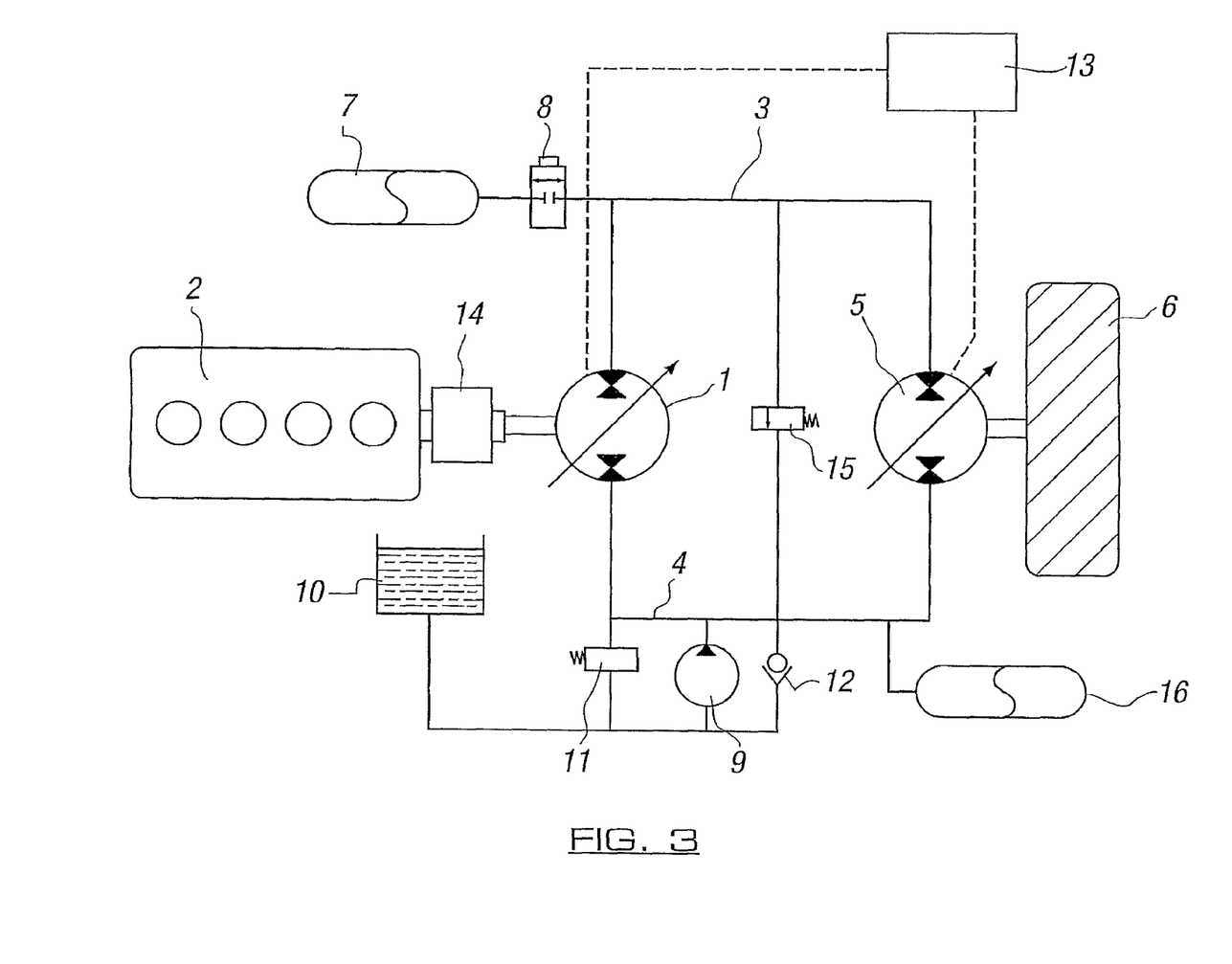
FIG. 3 shows a system with an additional low-pressure accumulator.

FIG. 3 shows an arrangement in which a second, possibly smaller, low-pressure accumulator 16 is coupled into fluid line 3. This arrangement can help to stabilize the pressure in fluid line 3 during transients and the effects of fluid compressibility on the high pressure side and for thermal expansion of the fluid. It could also expand the speed range at which the regenerative braking process could be started, by maintaining pressure in fluid line 4 until it has emptied. In order to avoid inlet cavitation of the second fluid working machine 5, deceleration energy capture would have to be phased in such a way that the rotational speed of the second fluid working machine 5 has reduced far enough by the time that the low pressure accumulator 16 is empty, that said machine could operate with reservoir 10 as its inlet pressure.

It would further be conceivable that the charge pump 9 is operated by a Venturi pump. In this implementation the Venturi pump could be operated with high-pressure fluid from the fluid line 3.

It would further be conceivable that the charge pump 9 is directly operated from the first fluid working machine 1. With the clutch unit 14 in the open condition and the first fluid working machine 1 powered by the accumulator 7 this would allow the operation of the charge pump 9 when the prime mover 2 is stopped.

It would further be conceivable that the charge pump 9 is directly operated from the prime mover 2. With the clutch unit 14 in the open condition this would allow the operation of the charge pump 9 when the fluid working machine 1 is stopped.

It would further be conceivable that a pressure transducer is installed in fluid line 4 and that the charge pump 9 and/or the pressure control valve 11 are actively controlled to maintain a set pressure in fluid line 4.

It would further be conceivable that the charge pump 9 operates only to provide an initial charge to low-pressure line 4

It would further be conceivable that the system operates without the charge pump 9. In this case it would be possible to charge the fluid line 4 by discharge of the accumulator 7. Said discharging could be operated in any of the following three ways.

While the flow control valve 8 is open the pressure control valve 15 could be lowered until its set pressure is below the pressure in fluid line 3. Fluid would now flow from fluid line 3 into fluid line 4 until its set pressure has been reached and the pressure control valve 11 opens.

The second fluid working machine 5 could be operated as a motor, with the flow control valve 8 in the open position, such that its flow exceeds that of the first fluid working machine 1 which is operated as a pump, therefore providing accumulator fluid towards the fluid line 4.

The first fluid working machine 1 could be operated as a motor, with the flow control valve 8 in the open position, such that its flow exceeds that of the second fluid working machine 5 if operated as a pump, therefore providing accumulator fluid towards the fluid line 4.

The preceding three methods might be employed together or separately as a special startup operation or during normal driving operation. To ensure the availability of fluid in the accumulator 7 there would always be the need for an accumulator charge event prior to discharge. The charge event could be through either the first fluid working machine 1 or the second fluid working machine 5 operating as a pump at low pressure from line 4, and could occur either as a special startup event or during normal driving to fully or partially charge the accumulator 7. This would be possible at a time when either machine is operating at low speeds below its fill speed without charge pressure. Accumulator charge could be retained between operating cycles (turn off and turn on) to avoid the need for a special startup charging event.

Figure 4:
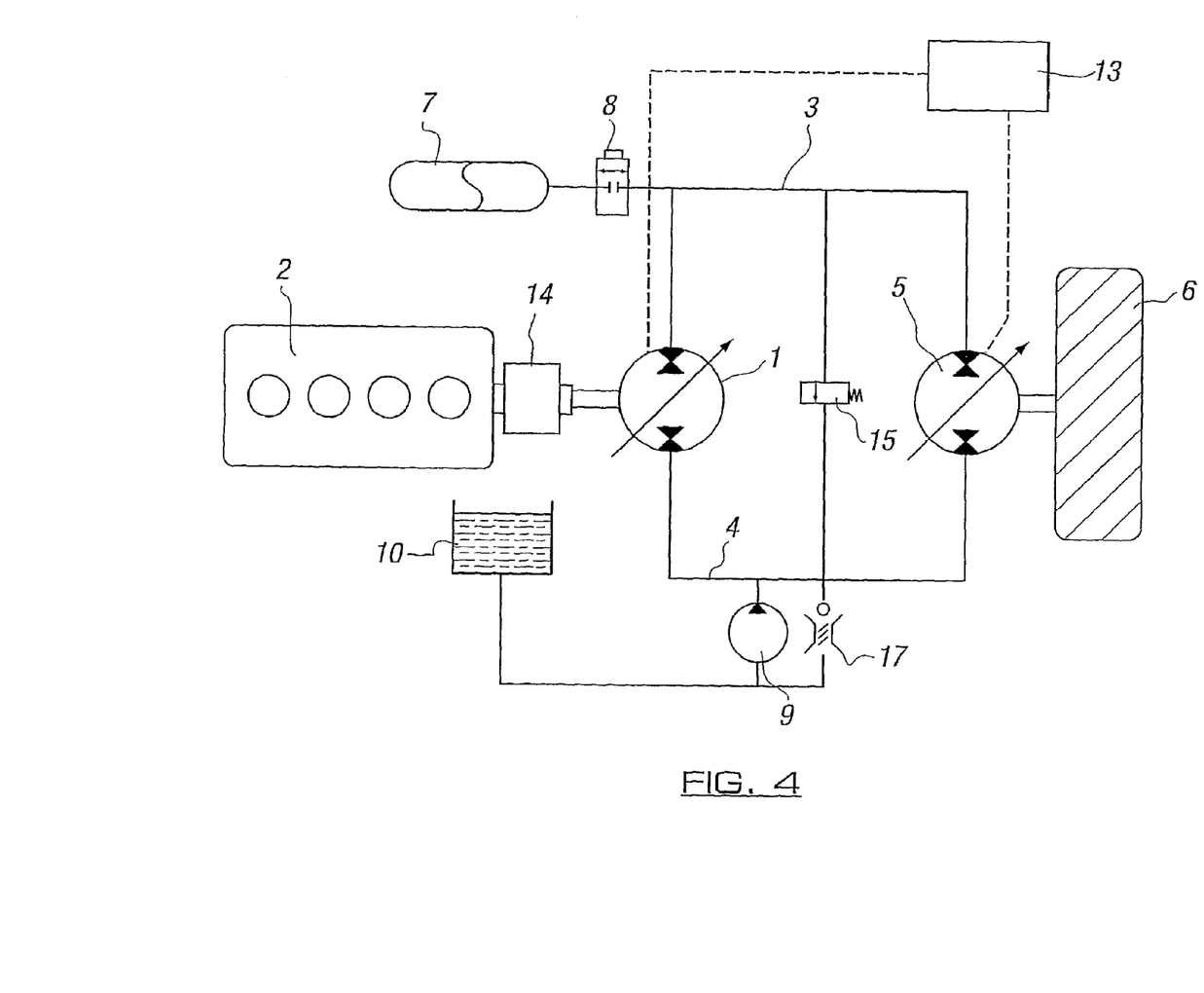
FIG. 4 shows a system with an integrated relief and one way valve unit.

The pressure control valve 11 and one-way valve 12 could be combined into one unit 17 as shown on FIG. 4.

It would further be conceivable that the pressure control valve 11 is operated so that there is a continuous flow of fluid between the fluid line 4 and the reservoir 10 in order to extract air from the system and exchange fluid with the reservoir 10.

Figure 5:
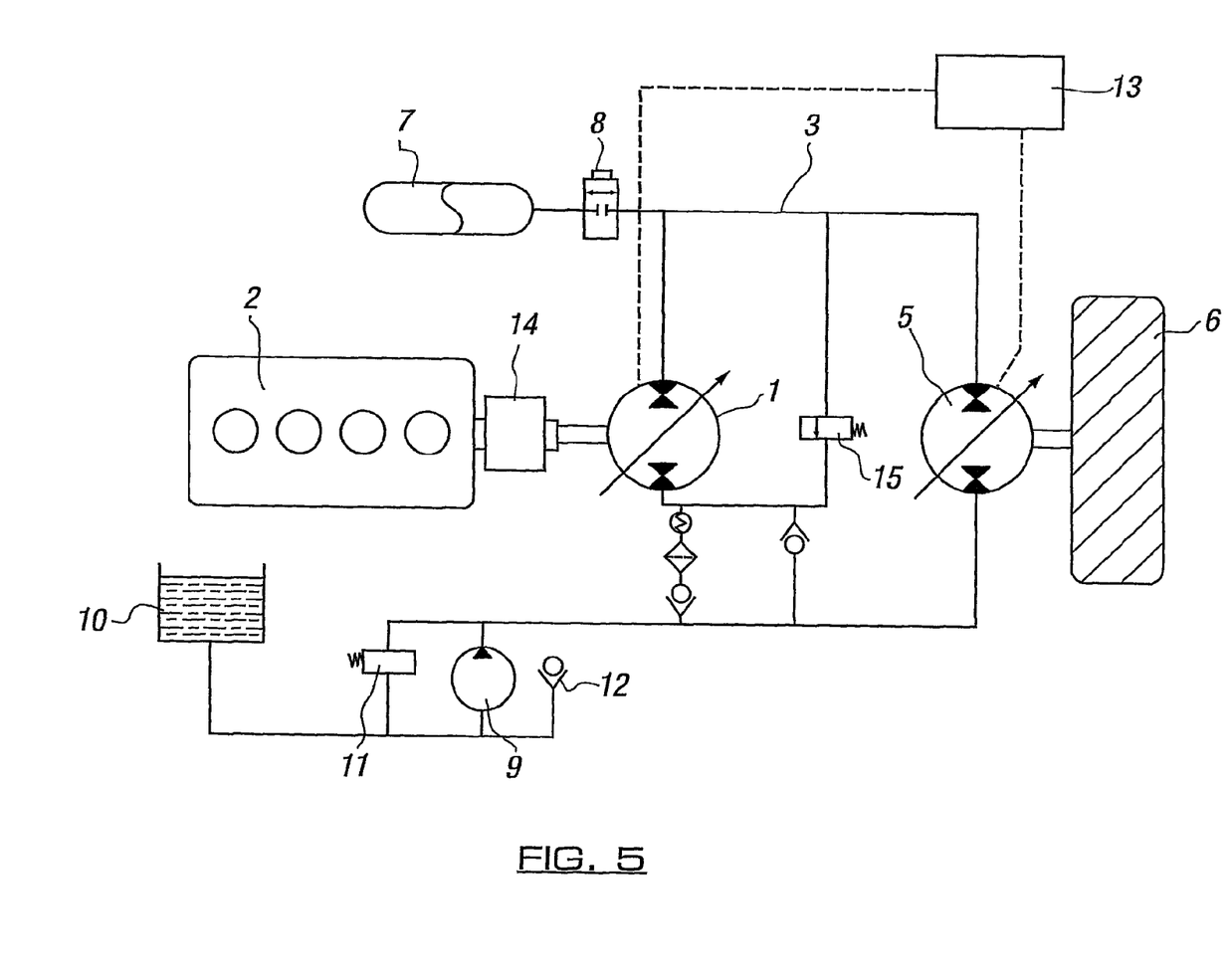
FIG. 5 shows a system with a fluid conditioning circuit.

FIG. 5 shows how a filtration unit 18 and/or a cooling unit 19 could be placed in the fluid system in order to condition the working fluid.

Figure 6:
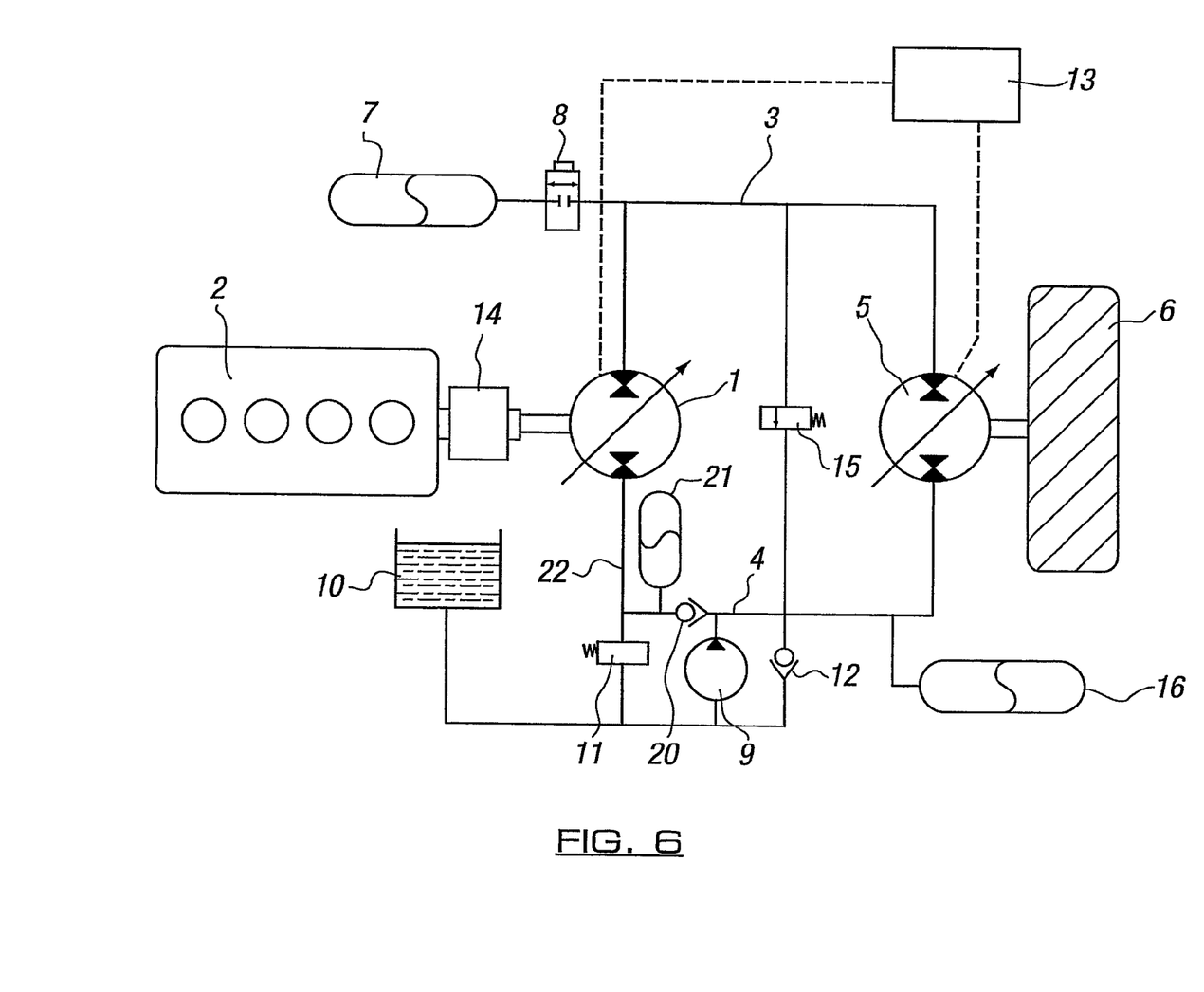
FIG. 6 shows a system with an additional one-way valve and low-pressure accumulator.

FIG. 6 shows the addition of a check valve 20 that splits the low pressure line into two parts, 22 and 4, and an optional low pressure accumulator 21. The check valve allows the pressure in inlet line 22 of the first machine to be maintained at the charge pressure during decelerating energy capture or braking, while allowing the second machine 5 to intake from the atmospheric reservoir 10 through its line 4. If the next driving event requires to pump fluid from the first machine 1 to the second machine 5, then said first machine will already have the required charge pressure at its inlet 22 and will operate normally. Fluid entering line 4 from the second working machine 5 will then pass through valve 20 to replace that being removed from line 22, once enough fluid has entered line 4 to raise the pressure in said line to that in the inlet line 22 of the first machine. This is particularly effective with the inclusion of low pressure accumulator 21 which will maintain pressure in line 22 during opening of the check valve 20. This system reduces the need for charge pump 9 because it maintains charge pressure on first machine 1 in the transition from energy capture to energy reuse. Alternatively, the charge pump may only need to operate once at system startup in order to initially charge the low-pressure line 22 and any attached low-pressure accumulator, reducing the energy consumed by the charge pump.

The invention claimed is:

1. A transmission comprising a first fluid working machine for connection to a prime mover, one or more second fluid working machines for connection to a mechanical load or loads and a fluid system linking the first and second working machines, the fluid system having a high-pressure side and a low-pressure side each connected to said first and all said second fluid working machines, and a fluid accumulator on the high-pressure side, and including a fluid reservoir and a fluid controller operable to admit fluid therefrom into the low-pressure side of the fluid system, and including a pressure control valve connected between the reservoir and the low-pressure side, for limiting the pressure level of the low-pressure side, wherein the second fluid working machines include chambers of variable volume having electronically controllable valves such that each of said chambers has pumping, motoring and idling modes of operation, and the second fluid working machines are operable to both source fluid to and sink fluid from each of said high-pressure side and said low-pressure side.

2. A transmission according to claim 1, wherein said fluid controller is a one-way valve arranged or controlled to open when the pressure in the low-pressure side is lower than that in the reservoir, but to prevent fluid from returning to said reservoir when the pressure in the low-pressure side is higher than that in said reservoir.

3. A transmission according to claim 2, wherein the pressure control valve and one-way valve are incorporated in a single unit.

4. A transmission according to claim 1, including a one-way valve between the second fluid machine's low-pressure port and that of the first machine, arranged or controlled so as to allow fluid to pass from the secondary machines to the first machine but not in reverse, and having the fluid controller connected to the inlets of the secondary working machines, and having the pressure control valve connected to the inlet of the first working machine.

5. A transmission according to claim 1, including one or more fluid accumulators on the low-pressure side.

6. A transmission according to claim 1, including a pressure transducer in the low-pressure side of the fluid system for maintaining a set pressure in the low-pressure side.

7. A transmission according to claim 1, including a charge pump for pumping fluid from the reservoir to the low-pressure side of the system.

8. A transmission according to claim 1, including a filtration unit in the fluid system.

9. A transmission according to claim 1, including a cooling unit in the fluid system.

10. A transmission according to claim 1, including a high-pressure pressure relief valve between the high-pressure side and the low-pressure side.

11. A transmission according to claim 1, wherein the low-pressure side is able to withstand an elevated low-pressure above that of the reservoir.

12. A transmission according to claim 11 wherein at least one of the first second fluid working machines require an elevated pressure in the low-pressure side above that of the reservoir to achieve their full operational speed in the pumping mode.

13. A transmission according to claim 1, wherein the or each second fluid working machine is capable of operating in the pumping mode at a speed lower than its maximum operating speed without an elevated pressure in the low-pressure side.

14. A method of operating the system according to claim 1, wherein an elevated charge pressure is applied to the low-pressure side at times when there is zero flow or an outflow of fluid from the fluid accumulator, and pressure in the low-pressure line is allowed to fall while fluid is being added to the fluid accumulator, and the fluid controller is operated so as to admit fluid to the low-pressure side from the reservoir at times when fluid is being added to the fluid accumulator and the pressure in the low-pressure side falls below the pressure of the reservoir, and the pressure control valve is operated so as to return fluid to the reservoir from the low-pressure side at times when fluid is being withdrawn from the fluid accumulator and the pressure in the low-pressure side rises above the desired pressure being a pressure above that of the reservoir, and the fluid controller and the pressure control valve are operated so as to effectively disconnect the low-pressure side from the reservoir at all other times.

15. A method according to claim 14, wherein the initial charge of the low-pressure line is achieved by discharging the high-pressure accumulator.

16. A method according to claim 14, wherein the path from said high-pressure accumulator to the low-pressure line is achieved by operating the first working machine in the motor mode.

17. A method according to claim 14, wherein the path from said high-pressure accumulator to the low-pressure line is achieved by operating the second working machine in the motor mode.

18. A method of operating the transmission according to claim 10, wherein the path from said high-pressure accumulator to the low-pressure line is through said high-pressure pressure relief valve.

19. A method according to claim 14, wherein the high-pressure accumulator is initially charged or partially charged by operating the first fluid working machine in the pump mode from the low-pressure line, said low-pressure line being at that time in its discharged state.

20. A method according to claim 14, wherein the high-pressure accumulator charge is retained between operating cycles of the system.

21. A method according to claim 14, wherein the high-pressure accumulator is initially charged or partially charged by operating the second fluid working machine in the pump mode from the low-pressure line, said low-pressure line being at that time in its discharged state.

22. A method according to claim 14, wherein the filling operation of the accumulator from the pumping operation of either or both of the first and second working machines is restricted to such times that the first or second working machines respectively are rotating at speeds where they are capable of operating without a charge pressure.

23. A method according to claim 14, whereby the pressure fall in the low-pressure line during filling of the fluid accumulator caused by the pumping action of the second fluid working machines, happens at a rate so as to always maintain a low-pressure line pressure equal to or above that required for the operation of said machines at their contemporaneous rotational speed, and so that said speed decreases to a speed at which said machines can operate without an elevated low-pressure by the time the fluid controller opens.

* * * * *